G. E. Cullen &
P. J. A. Turner
Inventors

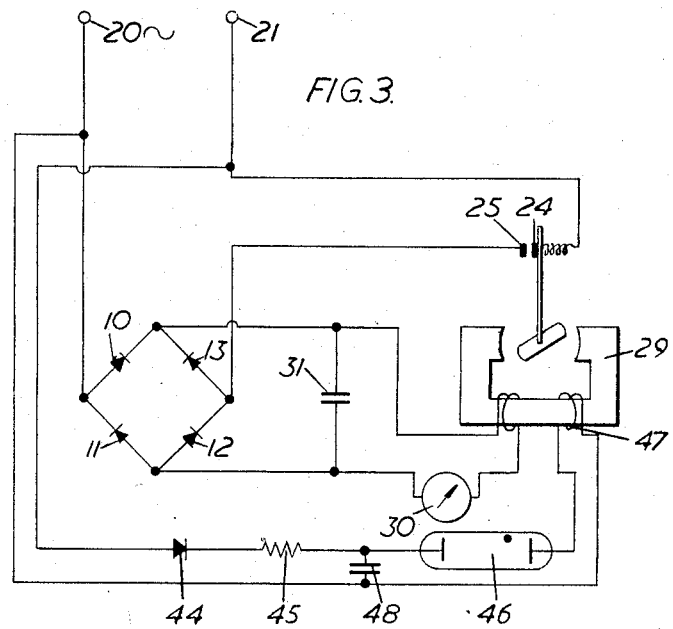
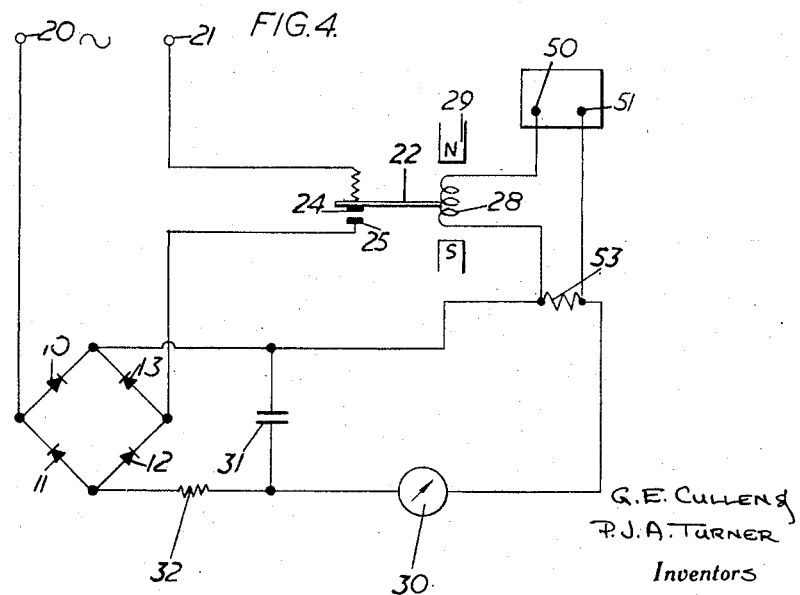

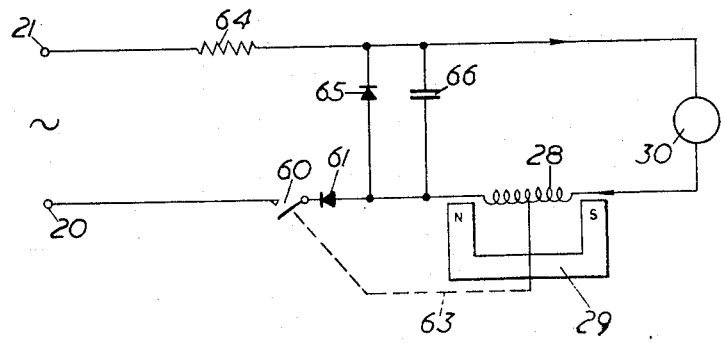
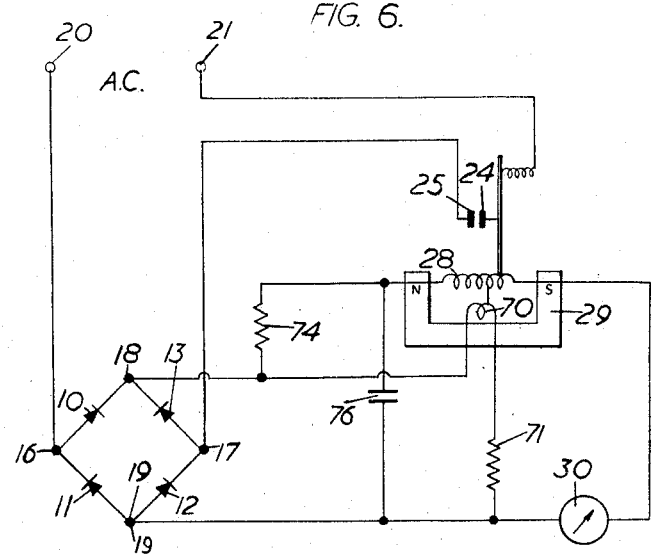

United States Patent Office 2,904,735
Patented Sept. 15, 1959

2,904,735

FORCE RESPONSIVE SERVOSYSTEM

Graeme E. Cullen and Peter J. A. Turner, Glasgow, Scotland, assignors to Kelvin & Hughes Limited, Glasgow, Scotland Application January 17, 1956, Serial No. 559,741

4 Claims. (Cl. 318—32)

This invention relates to means for measuring (which may include indicating, recording and/or controlling) a variable.

This invention provides a means for regulating or controlling the magnitude of an electric current in a circuit in such a manner that the said current provides a means of measuring a force, e.g. electromotive force, or a force such as may be derived from a measurement of temperature, pressure, fluid flow or the like.

According to the invention we provide means for measuring and/or controlling a variable comprising means which derive from a unidirectional current a mechanical or electromotive force which is opposed to a force that varies in accordance with said variable, and wherein the magnitude of the unidirectional current is so controlled that the opposed forces are maintained in or near continuous balance, said unidirectional current being utilised for measurement or control. The unidirectional current provides a means whereby the mechanical or electromotive force may be measured by an electrical instrument which can, if necessary, be remote from the primary equipment.

The source of power is preferably an alternating supply which is connected to a bridge type rectifier. This supply may be intererupted intermittently by the opening and closing of a contact on the alternating current side of the bridge rectifier in response to the relationship to a condition of balance between the mechanical or electromotive force derived from a unidirectional current which is produced by the bridge rectifier and the mechanical or electromotive force which is to be measured.

A particular advantage of the bridge rectifier arrangement is that it provides a path for the discharge of energy stored in the reactive elements of the unidirectional current circuit thus preventing the sparking and damage which would otherwise affect the control contacts.

The invention will now be further described by way of example with reference to the accompanying diagrammatic drawings wherein:

Figure 3 is a circuit diagram of a second modification of Figure 1.

Figure 4 is a circuit diagram of a third modification of Figure 1.

Figure 5 is a circuit diagram of a fourth modification of Figure 1 simplified.

Figure 6 is a circuit diagram of a fifth modification of Figure 1.

Figure 1:
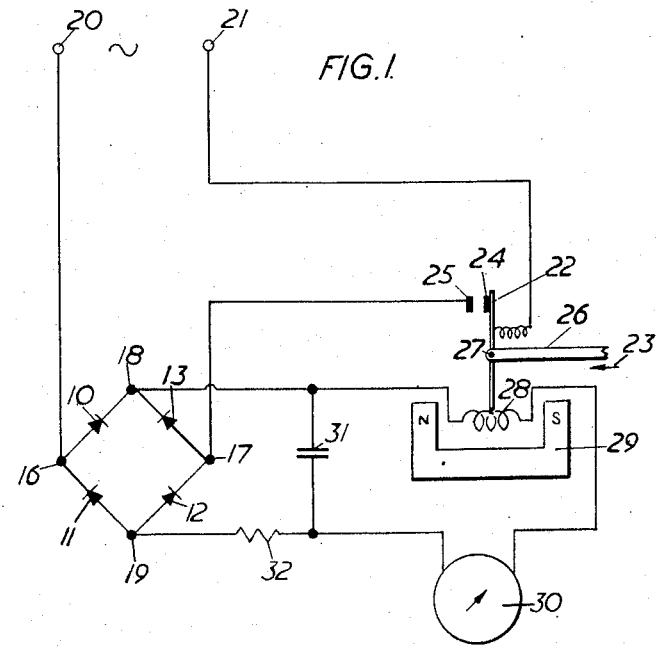
Figure 1 is a circuit diagram of a force measuring apparatus made in accordance with the invention.

Referring first to Figure 1, four rectifiers 10, 11, 12, 13 are connected to form a bridge-type rectifier such that on receiving an alternating current supply across its opposite corners 16, 17 a unidirectional current is supplied from its other opposite corners 18, 19. Terminals 20, 21 are connected to a source of alternating current. The terminal 20 is connected to the corner 16 and the terminal 21 is connected to a lever 22 that carries a contact 24 adapted to engage a contact 25 that is connected to the corner 17.

The force (F) to be measured is applied in the direction of the arrow 23 to a rod 26 pivoted at 27 to the lever. The lever is attached to a moving coil 28 constituting an inductive load and situated in the magnetic field of a permanent magnet 29 thereby forming an electromagnetic device capable of producing a mechanical force proportional to the current in the coil.

When the contacts engage current passes in one half cycle through rectifiers 10 and 12, and in the other half cycle through rectifiers 11 and 13, to the coil 28. On opening the contacts the transient current flows through all the rectifiers.

The unidirectional current through the moving coil increases until a force is produced equal and opposite to the force F after which the lever contact 24 will move away from the bridge contact 25 thereby interrupting the supply of current to the rectifier.

In operation the lever contact 24 will vibrate in such a manner as to control the current through the moving coil in a direct proportion to the applied force F. This current may be measured by any one or more suitable meter or indicator which may be remote from the remainder of the equipment. A meter 30 is shown for this purpose in series with the coil.

In addition to its vibratory action the lever contact 24 and contact 25 to which the variable force to be measured is applied, may be so constructed that the resistance between them is an inverse function of contact pressure.

A condenser 31 is connected across the corners 18, 19 of the bridge and a resistance 32 is connected in the lead to the corner 19. This condenser and resistance are provided for reducing the amplitude of the fluctuations of the unidirectional current.

Sparking and consequent burning of the contacts, which might otherwise be expected, is in this arrangement substantially prevented by the discharge of reactive energy which takes place in the rectifiers.

It will be understood that the said force F may itself be the variable which it is required to be measured, or it may be derived indirectly from some other variable as, for example, a fluid pressure which could be made to produce the mechanical force F by means of a bellows, diaphragm or Bourdon tube. Or the force might be the result of a temperature change in some suitable element, such as a fluid filled bellows or a bimetallic element.

Moreover, the force F might be made to be accurately constant as, for example, by means of a weight and the circuit would then provide a constant current and, as such, would have a number of uses, for example electrical instrument calibration.

A further advantage of the arrangement is that since it it self-balancing in operation the derived current is substantially independent of variations of the supply voltage and of the line resistance in the measuring circuit, hence one or more meters may be connected in the circuit without compensation.

Figure 2:
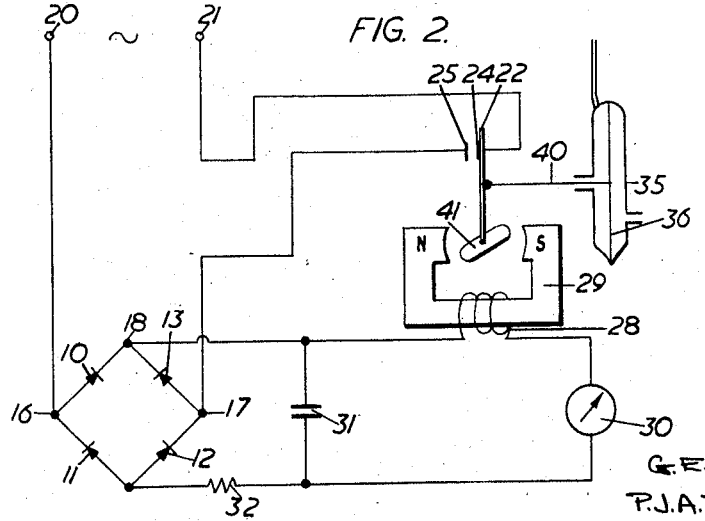
Figure 2 is a circuit diagram of a modification of Figure 1 using a pressure diaphragm.

Figure 2 shows a further embodiment of the invention in which the electro-mechanical device is of the solenoid or "moving-iron" type and, as is well known in the art, the generated force is proportional to the square of the current within certain limitations. This type of device is therefore particularly suitable for use where the applied force F is itself derived from some indirect measurement where F is proportional to the square of the variable to be measured, as is the case in measurement of fluid flow.

A casing 35 is divided internally by a flexible diaphragm 36 and has inlets at 37, 38 on opposite sides of the diaphragm. The latter is connected by a rod 40 to the lever 22.

Assuming that two fluid pressures P1 and P2 are derived from a flow measuring device, such as an orifice or the like and are applied to the inlets 37, 38 at opposite sides of the diaphragm 36. Their difference produces the force F which varies as the square of the fluid flow to be measured. This is applied to the lever 22 and closes the contacts as before. However, the lever is carried by the moving iron 41 and the coil 28 constitutes part of the electro-magnet or solenoid for actuating the moving iron. The contacts remain closed until the opposing force generated by the solenoid device separates the contacts. Since this opposing force is also proportional to the square of the current in the coil, it follows that in conditions of balance the current in the coil and in the meter (which may be remote) is in direct linear proportion to the fluid flow to be measured. In other respects the operation is as described in respect to the first arrangement.

It has, however, been found in operation that the basic arrangement, including the "moving-iron" type of electro-mechanical device suffers from a defect in its accuracy due to the magnetic hysteresis which is inherent in the "iron." This may be reduced by suitable choice of magnetic alloy for the "iron" but is nevertheless always present to an undesirable degree.

The effect of the hysteresis is that once the "iron" has been magnetised it requires only a smaller current to develop a given magnetic flux if the current is decreasing than would be required for the same flux when the current is increasing.

A convenient method of overcoming this defect is to pass at regular intervals short pulses of reverse magnetising current either through the main coil of the solenoid device or through a separate subsidiary coil provided for the purpose. Such pulses may be generated by any suitable means such as a thermal "flasher" or a motor operated contact. A particularly suitable means for providing this effect, however, is shown in Figure 3 and consists in the provision of a rectifier 44, resistance 45, and gas filled diode 46, and further coil 47 on the same magnet 29 all connected in series across the alternating current input terminals with a condenser 48 in parallel therewith. The rectified current charges the condenser 48 relatively slowly and when the diode 46 discharges the current in the coil 47 tends to demagnetize the "iron" of the solenoid device. This is immediately restored by the balancing current in the first coil.

In this way the solenoid device is kept continuously operating in conditions equivalent to "increasing flux" and the hysteresis inaccuracy is eliminated.

Figure 4 shows a further embodiment of the invention adapted to the measurement of an electromotive force.

In this embodiment the form of the invention first above described is modified by connecting the coil 28 in series with terminals 50, 51 connected to a source of E.M.F. which is to be measured and which is connected also in series with an auxiliary resistance 53. The coil as before is movable in the field of a permanent magnet 29. The coil, lever contact 24, and bridge contact 25, as before control the supply of alternating power to the bridge rectifier whose output circuit includes the auxiliary resistance 32 and a meter 30. The auxiliary resistance is also connected in series with the meter across the corners 18, 19 of the bridge. In operation, if the unknown E.M.F. causes a current to flow through the coil 28 and the auxiliary resistaance 53, the resulting deflection of the coil will cause the contact 24 to engage the contact 25 and cause alternating current to be supplied to the bridge rectifier, which results in a unidirectional current flowing through the auxiliary resistance and the meter. This current will increase until its magnitude is such that, in passing through the auxiliary resistance 53, a potential difference is created which is equal and opposite to the unknown E.M.F. After this condition has been reached the current in the coil will fall to zero and the contacts will separate, interrupting the supply of alternating current to the bridge rectifier. In practice the lever contact 25 will tend to vibrate between the open and closed position and the mean potential difference across the auxiliary resistance will be maintained continuously equal and opposite to the unknown E.M.F. If the auxiliary resistance is made to have a constant resistance value then the unidirectional current through it will be in proportion to the unknown E.M.F. and can be measured by the meter which may, if required, be remote from the primary apparatus. The unidirectional current circuit also contains the aforesaid condenser 31 and resistance 32 which together have the effect of smoothing out the fluctuations in the unidirectional current. It will be understood that the value of the auxiliary resistance may be chosen so that the current through it and through the meter are comparatively large in relation to the E.M.F. to be measured. It will also be understood that the current is substantially independent of variations in the supply voltage and of variations, within limits, of the resistance in the unidirectional current circuit, so that if the meter is required to be remote, the resistance of the transmission lines it not important. Moreover, more than one meter may be connected in series without compensation. It will also be appreciated that for some purposes it might be desirable to make the value of the auxiliary resistance variable with temperature so that compensation can be achieved for effects which may in fact be external to the system.

In Figure 5, a switch 60 is connected in series with a rectifier 61 and the coil 28 associated with the magnet 29. The coil is connected to the movable element of the switch 60 by means indicated as a dotted line 63. Terminals 20, 21 to A.C. supply. When switch 60 is closed the rectifier 61 passes half wave unidirectional current through the coil 28. A condenser 66 smooths the ripples both of the A.C. and also those which arise from opening and closing of the switch. When the switch is opened a rectifier 65 provides a discharge path for the current by providing a neutralizing path between terminal 21 and coil 28. A resistance 64 serves as a current reducer to prevent too rapid charging of the condenser 66.

Figure 6 shows a modification of the construction shown in Figure 1, in which a second coil 70 (of relatively few turns) is added to the electro-magnetic device. The coil 28 is connected in series with a resistance 74 and in parallel with the coil 70. A condenser 76 is connected across the coil 28. The coil 70 is connected with a series resistance 71 as a shunt across the output side of the rectifier. The coil 70 operates as a voltage coil of a relatively short time constant, and it will therefore pass current immediately the contacts 24, 25 close and will cease to pass current as soon as the contacts open. The coil may be arranged in either of two ways to suit two different purposes in certain circumstances, viz:

1. If the coil 70 is connected so as to oppose the action of the main coil 28, i.e. in the opposite polarity to it, it tends to increase the contact pressure and to act as a "hold-on" coil making the contact action more positive.

2. If the coil 70 is connected in the same sense as the main coil 28 it will act in assistance to the main coil and since this supplementary winding has a short time constant it acts as an anticipatory device.

The coil 70 is attached physically to the main coil 28 but is electrically separate from it. The resistance 74 and condenser 76 give the current through the main coil a slow response but the resistance 71 is connected to have immediate response.

In any of the above examples the switch 24, 25 or 60 will be a mercury switch.

While there have been described above what are presently believed to be the prefrred forms of the invention, variations thereof will be obvious to those skilled in the

What we claim is:

1. Means for measuring or controlling a variable comprising a rectifier device which provides a unidirectional output from an alternating current input thereto, separable contact means in one of the input leads of said device, means for applying a force to said contact means for controlling the contacting periods of said contact means, electro-magnetic means deriving a force from said unidirectional current and applying said force to said force applying means in one direction, said means for applying a force comprising means for applying a force proportional to said variable in the opposite direction so that the two said forces are maintained in nearly continuous balance, and means for deriving from said unidirectional current a measurement or control of said variable and means for establishing a current path through said rectifier device when said contacts are separated whereby the current is dissipated by the resistance of the rectifier device.

2. Means for measuring or controlling a variable comprising a set of four rectifiers connected together to form a bridge, a pair of input leads for applying alternating current across two of the opposite ends of the bridge, a pair of output leads across the other two opposite ends of the bridge, separable contact means in one of the first pair of leads, said rectifiers feeding unidirectional current to said output leads, means for applying a force to said contact means controlling the contacting periods of said contact means, electro-magnetic means deriving a force from said unidirectional current and applying said force to said force applying means in one direction, said means for applying a force comprising means for applying a force proportional to said variable in the opposite direction so that the two said forces are maintained in nearly continuous balance, and means for deriving from said unidirectional current a measurement or control of said variable, whereby on separating said contact means the current discharges through said bridge and is dissipated by the resistance of said rectifiers.

3. The combination as claimed in claim 1 in which said electromagnetic means for deriving a force includes a moving coil in the circuit of said unidirectional current, said coil being disposed in the field of a magnet.

4. The combination as claimed in claim 3 in which said rectifier device includes a first rectifier which produces a half-wave unidirectional current in said moving coil and a second rectifier which provides for current discharge when said contacts are separated.

References Cited in the file of this patent

UNITED STATES PATENTS

| | | |
|---|---|---|
| 2,635,463 | Pouradier et al. | Apr. 21, 1953 |
| 2,686,893 | Markson | Aug. 17, 1954 |
| 2,688,253 | Markson | Sept. 5, 1954 |
| 2,780,101 | Kinkel | Feb. 5, 1957 |
| 2,798,191 | Brailsford | July 2, 1957 |
| 2,813,237 | Fluegel et al. | Nov. 12, 1957 |